Patented Apr. 23, 1946

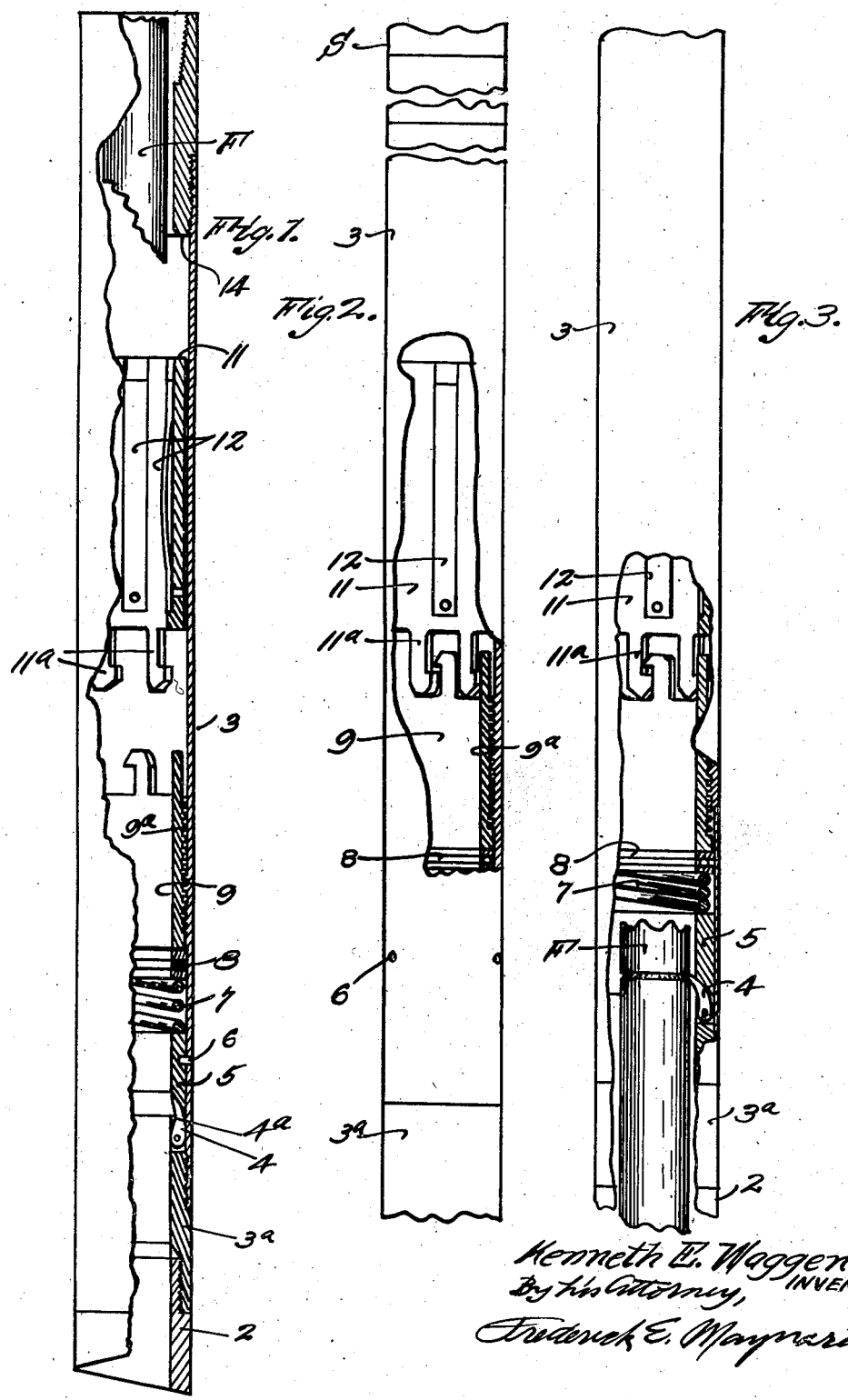

2,398,981

UNITED STATES PATENT OFFICE 2,398,981

WASH-OVER, OUTSIDE CUTTER

Kenneth E. Waggener, Brea, Calif.

Application May 6, 1944, Serial No. 534,497

9 Claims. (Cl. 164—0.6)

This invention is a fishing tool for deep well utility, as for the making of an outside cutting-off operation on a drill pipe unpullable from the hole or well, or stuck for one reason or another.

Heretofore two operations have been requisite when a drill fishing job is conducted. One is that a special wash-over string is made up and lowered into the hole for the purpose of washing out the mud confined between the frozen drill pipe and the bore face of the hole to bare as much length of the pipe as desired or possible and then pull this washing string from the hole. The other operation is to make up and lower a suitable outside cutting-off bit tool down over the naked or washed pipe, and operate the bit to sever the pipe, and then pull the bit and the entrapped, severed fish section of such length as may be enclosed in the tool.

An object of this invention is to provide a cutting-off fishing tool in which there is a mechanism, including a set of cutting bits, of such construction and arrangement of parts that the tool can be lowered into a hole to encompass the presented part of the fish and which tool can be raised, after the fish is encountered, as may be desired, without causing the bits to be set in cutting engagement with the fish. This is a novel and advantageous feature over types of fishing tools in which the effective recovering elements, as the cutters and pick-up means cannot be freely shifted vertically, that is, elevated, once they have passed down below a cooperative shoulder along the fish part which is to be salvaged from the hole.

It is here an object of the invention to provide a fishing tool whose construction is such that the tool may be operated in jobs on a fish that has no external shoulders along its length, and whereby, even if there be such shoulders the tool may be manipulated entirely without interference by such shoulders.

Broadly, an object of the invention is to provide a fishing tool which will provide for both a continuous wash over of the potential fish and a severance thereof at any point along the washed length thereof by free elevation of the cutting bits to the desired level regardless of incidental constructional shoulders which might be present along the washed fish, and, therefore, may be readily operated on a flush joint pipe.

Also, an object of the invention is to provide a fishing tool which is telescopic over a fish and has, in combination, a cutting mechanism which is controlled and made operative by the fish when the tool is rotated about the fish, and yet which mechanism may be moved up along the fish to any desired degree irrespective of fish shoulders.

The invention consists in certain advancements in this art as set forth in the ensuing disclosure and having, with the above, additional objects and advantages as hereinafter developed, and whose construction, combinations and sub-combinations, and details of means, and the manner of operation will be made manifest in the following description of the herewith illustrative embodiment; it being understood that modifications, variations and adaptations may be resorted to within the scope, spirit and principle of the invention as it is more directly claimed hereinbelow.

Figure 1 is an axial sectional view of the tool showing the cutter controlling fish gripping device in extended or disengaged position from the cutting device, and the latter in fixed or pinned, idle position.

Figure 2 is a detail sectional view showing the cutting device and the barrel of the tool moved up as to the fish gripping device preparatory to releasing the fixed cutting bits.

Figure 3 is a detail sectional view showing the wedging ring of the bits in the freed or sheared pin position and operative on the bits to feed them into the work, that is the fish body, while the tool is bodily rotated about the frozen fish and its adherent gripping device.

The tool unit embodies a suitable size, tubular body structure formed of appropriate bowl 2 and barrel 3 sections; the latter attached at its upper end to a suitable tool string S by which the unit may be lowered to encompass the well part to be fished and may be rotated and raised or lowered, as needed, about the potential fish while wash-over water is pumped down the hole to bare as much as possible or desired of the fish; which may be a frozen drill pipe for example.

Suitably disposed in the barrel, as on its nipple 3a is an annular set of cutting bits 4 pivoted at their lower ends and pointing upwardly and tiltable inwardly but normally releasably fixed in inoperative upright position by any suitable means, as by weak keys 4a.

To positively free and press the bits inwardly their upper ends are engageable by a cam or wedge ring 5 slidably fitting in the barrel bore and normally locked by suitable means, as shear pins 6, to the barrel wall.

To feed the bits inwardly constantly during their cutting action the ring 5 is loaded by an imposed, helical spring 7 compressed insufficiently to shear the pins 6, under a header ball-bearing 8.

Abutting the anti-friction bearing 8 is a sleeve 9 having external threads 9a fitting threads in barrel 3 and whose function is to apply enough pressure to the spring 7 to cause severance of the pin or pins 6 which hold the cam ring 5 in ineffective position until it is desired to trip the cutting bits 4 for biting into the intruded fish F.

It is desirable that the tool unit may be gradually lowered into the hole while wash water is pumped down to wash over as long a part of the frozen fish as may be possible or intended and then, with the same string S and tool unit make a severance of the fish at a suitably high point by elevating the tool string until the cutting bits are at about the chosen level on the fish, and then by merely rotating the tool string and the bottom attached cutting unit unpin the cam ring 5 and allow the spring 7 to force the ring against the released bits 4 to unkey them (if keyed) and to feed them into the frozen part of the fish to be severed.

For the said releasing purpose there is slidably and turnably fitted in the bore of the barrel 3, above the spring 7 and the sleeve 9, an elongate, tubular jacket 11 having on its lower end a spur means 11a, to interclutch with the upper end of the sleeve 9 for effectively coupling them against relative rotation. As the tool unit is lowered about the stuck fish the jacket telescopes over the fish and is frictionally held thereto by a system of elongate, upright, inbowed spring bars 12 appropriately attached, in a ring arrangement, to the bore face of the jacket 11. As the barrel 3 is lowered the friction between the fish and the spring bars 12 causes the jacket to stand still until its upper end is engaged by a shoulder 14 provided in the barrel structure. The jacket is therefore fully unlatched from the sleeve 9 and thereafter the jacket and its jaws 12 will be forced slidingly down along the gripped fish until such time as it may be desired to re-elevate the tool unit along the now washed fish, regardless of whether it has external shoulders or not.

It is possible with this tool to wash over many feet of a fish (along its length) and to then pull the cutting mechanism up a considerably along the fish before a first cut is made since the vise jaws of the jacket 11 will forcibly pull up over and past such drill pipe shoulders as may be met on the pipe to be cut.

When the tool barrel moves up after the jacket is arrested on the fish by the jaws 12 the sleeve is interlocked at the spurs 11a to the jacket 11 and if the barrel is rotated (by the string S) the sleeve will screw downwardly in the barrel by rotation of the string in one direction; for instance clockwise—looking down the axis of the tool.

At the level where the cut is to be made in the fish the tool string and the cutting unit are now slowly rotated with the result that the friction of the jaws 12 on the fish holds the jacket fast against rotation with the barrel 3 and as the jack sleeve consequently works down in the barrel threads the spring 7 will be compressed by resistance of the rotating, but non-shifting, cam ring 5 and finally this will be freed or unpinned by breakdown of the shear pins 6 and thereafter the cutting bits will be pressed free from their restraining means and forced inwardly with requisite pressure to take a cut in the fish whilst being powerfully rotated around the fish by the now relatively rotatively driven string S and its attached tool barrel 3.

As soon as the fish is severed at the cutting plane the bits act to grapple under the upper, cut off, fish section and then the whole tool is pulled up by the string.

It will be clear that the primary cutter control tripping means, that is the jacket and its jaws, in no manner interfere with the lowering or elevating of the tool unit and do not depend on any form of cooperative stop means on or along the fish pipe to trip the cutters. This capacity allows use of the tool to wash over the fish for a great length and the ready pull back of the tool unit to any level for making the severing cut.

What is claimed is:

1. A deep well, drill pipe wash-over and outside cutting-off tool having, in combination, a rotary barrel, a set of normally inoperative bits pivoted in the barrel, a temporarily fixed, wedge ring operative when free to press the bits into contact with a pipe to be severed and raised, and means mounted in the barrel to release the fixed ring for action on the bits and including a sleeve screwed in the barrel, and a friction means freely slidable and turnable in the barrel and interlockable with said sleeve to hold it while the barrel is relatively rotated.

2. The tool of claim 1, and a spring interposed between the ring and the sleeve for advancing the bits into the pipe to be cut after the ring is released.

3. A wash-over and cutting off fishing tool including a barrel adapted to be lowered onto a part to be severed and recovered, a set of bits in the barrel, a fastened, releasable wedge ring operative to contract the cutters onto said part, resilient means acting constantly on the ring with shifting effort insufficient to release it, rotary means mounted in the barrel and operative to increase the effort of said resilient means, and a friction means freely slidable and turnable in the barrel and positively interlockable with said rotary means to hold it while the barrel is relatively rotated; said friction means being adapted to grapple on the said part and being lowerable to a desired position thereon and then pulled back regardless of encounterable shoulders on said part.

4. The tool of claim 3; said rotary means consisting of a sleeve in the barrel and turnably engaging the resilient means.

5. The tool of claim 3; said resilient means including a spring disposed in an unattached manner between said rotary means and the said ring.

6. A tool of the class described and including a rotary barrel to be lowered over a part frozen in a well or hole, a set of part cutting bits in the barrel, a restrained means adapted to force the cutters into cutting position, means screwed in the barrel and operative to force the restrained means into effect on the cutters when the screwed means is rotated as to the restrained means, a coupling device adapted to be shifted into co-rotational interlock with the screwed means and which includes a friction device to grapple on and be slidable down and up to any desired position of the said frozen part without effect of a trip action on the cutters.

7. A deep well, drill pipe wash-over and cutting-off tool having in combination, a rotary barrel to be lowered over the said pipe, normally idle bits in the barrel, a restrained device to set the bits, a releasing means relatively rotary and unattached as to and for actuating the said device, and a friction means freely slidable and turnable in the barrel and interlockable with the releasing means to hold it while the barrel is relatively rotated.

8. The tool of claim 7; said restrained device and said releasing means having, relatively, axial shift.

9. The tool of claim 7; and a spring interposed between and unattached as to the restrained device and the releasing means and which is compressed by action of the device.

KENNETH E. WAGGENER.